United States Patent Office 2,880,094
Patented Mar. 31, 1959

2,880,094

PROCESS FOR ENHANCING FLAVOR OF MAPLE SYRUP

Joseph Naghski, Philadelphia, and Charles O. Willits, Glenside, Pa., assignors to the United States of America as represented by the Secretary of Agriculture No Drawing. Application September 17, 1957
Serial No. 684,626

9 Claims. (Cl. 99—142)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the effects of controlled fermentation of maple sap with specific organisms upon the color and flavor of maple sirup.

An object of this invention is to produce maple sirup with desired color and flavor properties. More particularly, an object of this invention is to subject maple sap to a controlled fermentation with specific organisms and from the fermented sap to prepare a maple sirup possessing desirable color and flavor characteristics.

There is a need in the maple sirup industry for sirups possessing different color and flavor characteristics. A sirup of pronounced maple flavor and light color is desirable for use as a pure table sirup. A sirup of pronounced maple flavor and dark color is required for blending with other, less expensive sirups. Sirups whose flavor levels and color intensities can be controlled are needed for use in a variety of products, as confections, desserts, or casings of cigarette tobacco.

The characteristics of sirups presently produced by the maple sirup industry are still dependent to a great extent upon the whims of nature. Although the objective is a premium quality, light-colored table sirup, the result is often a dark-colored sirup. Dark-colored sirups are always considered inferior because off-flavors detectable in these sirups are associated with the color. Accordingly, not suspecting that microbial growth could have beneficial effects, conditions favorable to adventitious microbial growth are condemned through an active education program. In striving for improvements of sirups by prevention of microbial degradation of the maple sap, the sirups produced are often lacking in adequate maple flavor and color.

In accordance with the present invention certain individual species of microorganisms, through the development of metabolites when cultured in maple sap, give rise to the production of sirups with accentuated maple flavor or color, or a combination of these characteristics, without an accompanying off-flavor. The practice of this invention makes it possible for the maple sirup industry to produce sirups to meet a specific end use.

In the practice of this invention a quantity of maple sap, collected under sanitary conditions, is charged into a sterile container, inoculated with a selected strain of microorganisms, incubated preferably at about 0.5° to 8° C. for a desired number of days, and then evaporated to sirup.

The collection of maple sap which is sterile, or contains a low level of viable contaminating microorganisms, is both feasible and practical and has been reported in Extension Bulletins, such as Cornell Bulletin 974, pp. 22–23, and in other publications such as Food Technology, vol. VII, pp. 81–3 (1953).

The fermentation conditions employed will depend upon the color and flavor desired in the final product and variables to be considered include the inoculum used, time, and temperature. The inoculum used in this process has been shown to be a critical factor in producing maple sirups of desired flavor and color.

The range of temperatures employed in carrying out this process approximates those existing under actual operating conditions of maple sirup production; that is, outdoor spring temperatures. As incubation of the inoculated maple sap also proceeds satisfactorily at indoor room temperatures, the process is considered to be operative at temperatures from freezing to those at which the microorganisms are inactivated.

Since temperatures other than those described in the accompanying examples may be established for the fermentation, and since the time interval required to achieve the same fermentative action will vary inversely with the temperature, the three to ten day time interval disclosed is not considered critical for all ranges of temperatures.

No adjustment of pH of the natural maple sap or additions of nutrients was found necessary for achieving good results with the process of this invention.

The sirups of desired color and flavor as described herein have been produced from sap using procedures that have been shown to simulate those occurring in a commercial open pan evaporator. Hence, this invention is directly applicable to present commercial practices.

The procedures described in the following examples were conducted under controlled conditions in which all variables other than the inocula added to the maple sap were maintained essentially constant. The inocula were prepared for actively growing pure cultures by washing the organisms from agar slants and making appropriate dilutions. Cultures of microorganisms disclosed in the examples are available from the type-culture collection of the Northern Utilization Research and Development Division, U.S. Department of Agriculture, Peoria, Illinois.

The following examples serve not only to illustrate in greater detail the practice of this invention but to present the methods of evaluation and the bases for selection of the specific microorganisms to perform special functions in the preparation of specialty maple sirups.

EXAMPLE 1

A nine gallon lot of sterile maple sap was withdrawn from a large batch of sap. Two gallons of the sap were used to prepare the control sirup. Seven gallons were dispensed into a sterile carboy. An inoculum of a pure culture of Pseudomonas NRRL B–1890 which provided 1,090,000 microorganisms per milliliter of sap was added. The inoculated sap was incubated in a cold room at 0.5–2.5° C. At the end of 3.6, and 10 days of incubation, samples were withdrawn for plate counts and 2-gallon portions were removed aseptically for conversion to sirup.

The 2-gallon portions of sap were evaporated to sirup using the following standardized conditions. Using a steam-jacketed kettle, the sap was evaporated rapidly (30–35 minutes) to a volume calculated to give a density of approximately 45° Brix. This sirup was transferred to a stainless steel beaker equipped with a condenser and refluxed one hour over a Meeker burner. The refluxed sirup was transferred to a 1-quart steam kettle and evaporated rapidly (5–8 minutes) to standard density sirup (65.5° Brix). The Brix determinations were made at 20° C. with an Abbe refractometer.

The control sirup and sirups from the fermented sap were allowed to cool, filtered through three layers of Whatman No. 2 filter paper in a Seitz filter to remove the insoluble "sugar sand" (organic acid salts) and subjected to chemical and organoleptic tests. Color indices were determined from absorption measurements at 450 mu. Percent of invert sugar was determined by the Berlin method (Official Methods of Analysis of the Assoc. of Official Agricultural Chemists, 8th edition, 1955). Flavor evaluations of the sirups were made by an experienced panel which rated the sirups as to a full-bodied maple flavor and an acrid caramel flavor. Data obtained from these tests for maple sirups prepared from maple sap fermented by Pseudomonas NRRL B-1890 are presented as Example 1 in Table I.

EXAMPLES 2 AND 3

The fermentations were conducted exactly as described in Example 1 with the exception that the inocula were pure cultures of yeast NRRL Y-2422 and Flavobacterium NRRL B-1889 respectively. The data collected regarding these examples are also presented in Table I.

The degree to which maple sap is fermented, and more especially, the individual specie of microorganism whose pure culture is employed for inoculum, have been shown to be outstandingly significant factors in determining the properties of the maple sirup product. By the practice of this invention maple sirups of enhanced flavor and desired color characteristics are readily available.

We claim:

1. In the production of maple sirup from maple sap the process comprising collecting maple sap under conditions which minimize access to, or growth of microorganism in said sap, inoculating said sap with a pure culture inoculum of a microorganism selected from the group consisting of Pseudomonas NRRL B-1890, Flavobacterium NRRL B-1889, and yeast NRRL Y-2422, incubating the inoculated sap until adequate microbial ac-

*Table I*

PROPERTIES OF MAPLE SIRUP PRODUCED FROM SAP FERMENTED BY VARIOUS MICROORGANISMS,

| Example | Days incubated | Increase in color index [a] over control | | | Change in percent invert sugar over control [b] | | | Flavor [c] | | | | | |
|---|---|---|---|---|---|---|---|---|---|---|---|---|---|
| | | | | | | | | Maple | | | Caramel | | |
| | | 3 | 6 | 10 | 3 | 6 | 10 | 3 | 6 | 10 | 3 | 6 | 10 |
| | Organism | | | | | | | | | | | | |
| 1 | Pseudomonas NRRL B-1890 | 0.22 | 0.61 | 2.15 | 0.0 | 0.0 | +0.1 | 2 | 3 | 4 | 0 | 0 | 0 |
| 2 | Yeast NRRL Y-2422 | 0.03 | 0.43 | 1.78 | 0.0 | +0.3 | +5.2 | 1 | 1 | 1 | 0 | 1 | 4 |
| 3 | Flavobacterium NRRL B-1889 | 0.20 | 0.52 | 1.15 | +0.0 | +0.4 | +0.6 | 2 | 2 | 2 | 0 | 1 | 2 |

[a] Color index, $A_{1 \text{ cm.}}^{86.3\%} = A_{450} (86.3/bc)$, where $A_{450}$ is the observed absorbance at 450 mu, $b$ is the depth of solution in centimeters and $c$ is the grams of solids as sucrose per 100 ml.
[b] Control sirups contained 0.16±0.02% invert (reducing) sugars.
[c] Flavor has been given numerical values of 0, 1, 2, 3, and 4 with 0 being lack of the particular flavor and 4 being the greatest amount. In the case of maple, 1 is indicative of good maple flavor as exhibited in the control sirup.

Of the examples cited fermentation of sap by a pure culture of Pseudomonas NRRL B-1889 produced the greatest effect. The flavor level attained a score or 2 after only 3 days, and was increased to a score of 3 and 4 after 6 and 10 days' fermentation, respectively. The unusual nature of this fermentation was the development of a high level of maple flavor without the production of caramel, although the color of the sirup was greatly increased. In commercial practice, the production of a dark-colored sirup (U.S. unclassified) rich in maple flavor and free of caramel is never encountered. Another unusual characteristic of the sirup resulting from this fermentation was the lack of reducing sugars. In commerce all strongly flavored, dark-colored sirups (U.S. grade B or below) always contain relatively large amounts of free reducing sugars.

Sirup made from sap fermented by a pure culture of yeast NRRL Y-2422, Example 2, is notable for the development of a strong caramel flavor. Although considered a dark-color sirup, a comparison of the color index data shows that the color is less intense than that present in the sirup of Example 1.

The flavor formed in sirup produced from maple sap fermented by a pure culture of Flavobacterium NRRL B-1889 was intermediate between that detected in the products of Examples 1 and 2, and the color was less intense than that of either of these previously discussed sirups.

The cited examples represent only a few of the results obtained in the practice of this invention and are presented in illustration of the highly specific action of certain microorganisms in regards to properties of sirups produced from maple sap in which these microorganisms have been cultured.

tion has occurred, and evaporating the fermented sap to maple sirup.

2. The process of claim 1 in which the inocculum is a pure culture of Pseudomonas NRRL B-1890.

3. The process of claim 1 in which the inoculum is a pure culture of Flavobacterium NRRL B-1889.

4. The process of claim 1 in which the inoculum is a pure culture of yeast NRRL Y-2422.

5. In the production of maple sirup from maple sap the process comprising collecting maple sap under conditions which minimize access to, or growth of microorganism in said sap, inoculating said sap with a pure culture inoculum of a microorganism selected from the group consisting of Pseudomonas NRRL B-1890, Flavobacterium NRRL B-1889, and yeast NRRL Y-2422, incubating the inoculated sap for 3 to 10 days at temperature within the range from 0° C. to that at which the microorganisms are inactivated, and evaporating the fermented sap to maple sirup.

6. The process of claim 5 in which the inoculum is a pure culture of Pseudomonas NRRL B-1890.

7. The process of claim 5 in which the inoculum is a pure culture of Flavobacterium NRRL B-1889.

8. The process of claim 5 in which the inoculum is a pure culture of yeast NRRL Y-2422.

9. A maple sirup of enhanced maple flavor containing less than 0.25% reducing sugars and having a color index of about 2.0.

References Cited in the file of this patent

UNITED STATES PATENTS

| 1,467,022 | Walton et al. | Sept. 4, 1923 |
| 1,467,599 | Gore | Sept. 11, 1923 |
| 1,534,166 | Dahlberg | Apr. 21, 1925 |